(12) United States Patent
Dolivo (10) Patent No.: US 10,663,113 B2
(45) Date of Patent: May 26, 2020

(54) SAFETY SYSTEM AND METHOD FOR A PORTABLE ELECTRICAL TOOL (71) Applicant: Felco Motion SA, Les Geneveys-sur-Coffrane (CH)

(72) Inventor: Yann Dolivo, Chavornay (CH)

(73) Assignee: Felo Motion SA, Les Geneveys-Sur-Coffrane (CH)

( * ) Notice: Subject to any disclaimer, the term of this patent is extended or adjusted under 35 U.S.C. 154(b) by 0 days.

(21) Appl. No.: 16/093,071

(22) PCT Filed: May 8, 2017

(86) PCT No.: PCT/IB2017/052659
§ 371 (c)(1),
(2) Date: Oct. 11, 2018

(87) PCT Pub. No.: WO2017/199124
PCT Pub. Date: Nov. 23, 2017

(65) Prior Publication Data
US 2019/0120427 A1 Apr. 25, 2019

(30) Foreign Application Priority Data
May 17, 2016 (CH) .................................. 00630/16

(51) Int. Cl.
*F16P 3/14* (2006.01)
*B25F 5/00* (2006.01)
(Continued)

(52) U.S. Cl.
CPC .......... *F16P 3/147* (2013.01); *B23Q 11/0078* (2013.01); *B25F 5/00* (2013.01); *H02H 1/0007* (2013.01)

(58) Field of Classification Search
CPC .... F16P 3/147; F16P 3/148; F16P 3/12; F16P 3/125; F16P 1/00; F16P 1/005;
(Continued)

(56) References Cited

U.S. PATENT DOCUMENTS 5,081,406 A * 1/1992 Hughes ................ B23D 59/005
318/478
6,055,842 A * 5/2000 Kobler ................ G05B 19/401
73/1.79
(Continued)

FOREIGN PATENT DOCUMENTS

EP 1452280 A1 9/2004
EP 2020275 A2 2/2009
(Continued)

OTHER PUBLICATIONS

International Search Report for PCT/IB2017/052659 dated Jul. 28. 2017, 6 pages.

*Primary Examiner* — Emily C Terrell
(74) *Attorney, Agent, or Firm* — Blank Rome LLP (57) ABSTRACT The present invention relates to a system for increasing the safety of a portable electrical tool (10), comprising: a generator (40) of a radio-electric signal, which generator is electrically coupled to said user (1) so as to inject into the body of the user (1) said radio-electric signal (s(t)), said radio-electric signal (s(t)) then being emitted by said user (1) in the form of an electromagnetic signal; and the portable electrical tool (10), which is arranged to be borne by a member of the user and comprises: a machining member (4); a holding member (2); an actuator connected to the machining member (4); an antenna fastened to the machining member (4) and/or the holding member (2) and arranged to receive a radio-electric signal corresponding to the electromagnetic signal emitted by the user (1). A computing module (30) determines a distance between the user and the
(Continued)

machining member and/or holding member on the basis of the electromagnetic signal received by the antenna, and modifies accordingly the speed of the actuator.

20 Claims, 5 Drawing Sheets

(51) Int. Cl.
*B23Q 11/00* (2006.01)
*H02H 1/00* (2006.01)

(58) Field of Classification Search
CPC ............ B23Q 11/0078; B23Q 11/0082; B23Q 17/2438; B23Q 11/0085; B23Q 11/0089; B23Q 11/0092; B25F 5/00; H01H 1/00
USPC ...................................................... 340/573.1
See application file for complete search history.

(56) References Cited

U.S. PATENT DOCUMENTS

| | | | |
|---|---|---|---|
| 2010/0064532 A1 | 3/2010 | Wittke et al. | |
| 2013/0127262 A1* | 5/2013 | Roser ................ | B23Q 11/0078 307/326 |
| 2016/0364961 A1* | 12/2016 | Cruz-Hernandez ...... | G08B 6/00 |
| 2017/0076564 A1* | 3/2017 | Cruz-Hernandez ...... | G08B 6/00 |

FOREIGN PATENT DOCUMENTS

| | | |
|---|---|---|
| EP | 2885962 A1 | 6/2015 |
| FR | 2831476 A1 | 5/2003 |
| FR | 2838998 A1 | 10/2003 |
| FR | 2846729 A1 | 5/2004 |
| FR | 3001404 A1 | 8/2014 |
| GB | 2473061 A | 3/2011 |
| WO | WO-2007/060698 A1 | 5/2007 |
| WO | WO-2013/013631 A1 | 1/2013 |

* cited by examiner

SAFETY SYSTEM AND METHOD FOR A PORTABLE ELECTRICAL TOOL

RELATED APPLICATIONS

This application is a national phase of PCT/IB2017/052659, filed on May 8, 2017, which claims the benefit of Swiss Application No. 00630/16, filed on May 17, 2016. The entire contents of these applications are hereby incorporated by reference.

TECHNICAL FIELD

The present invention relates to a safety system for a power tool. The present invention also relates to a method for such a security system.

STATE OF THE ART

In the context of the present invention, the expression "power tool" designates an electric or electrically powered tool. The tool can be electrically powered by a stand-alone power source. During its use, it is carried by a limb of the user, for example by his hand. In particular, the same limb that carries such a tool also makes it possible to control it, for example using a trigger. A power tool does not have a stationary position during its use, because the user moves it, for example to machine a new object or to better machine the same object. In other words, a power tool is not stationary, i.e. it does not always occupy the same position. It is therefore clear in the light of this definition that a machine such as a stationary saw, for example a table circular saw or a bench shear, does not fit into the definition of a power tool given in this context.

The power source of such a power tool can be for example a battery or a battery pack. In this case, the source is usually a separate part of the tool. In particular, the user can carry the tool with one hand and simultaneously wear the power source on himself, for example using a backpack, a harness or a belt. In another case, the power source of such a power tool is in the power tool.

A power tool includes a motor or actuator for transmitting a force to an external object on which the tool is working.

Pruning shears, shears, pliers, presses, a portable chainsaw, a portable circular saw, a portable jigsaw, a planer, a crimper, ripper, etc. for agricultural, viticultural, arboreal, industrial, craft, textile, food, medical, etc. applications are non-limiting examples of power tools according to the invention.

A power tool comprises a machining member and a support member for this object. The machining member makes it possible to machine an object and comes into direct contact with this object. It is mobile during the machining of the object and is actuated by an actuator of the power tool.

In the context of the present invention, the word "machining" indicates any operation performed on the object that makes it possible to transform it, for example to cut it, press it, slice it, plane it etc.

The support member supports the object during its machining and is fixed during the machining of the object. The support member is not actuated by the actuator of the power tool. Its presence is necessary to achieve this machining. The support member is also in direct contact with this object during its machining.

In the case where the power tool is a pruner, its movable blade is the machining member, because it allows an object, such as a branch, to be cut, and the counter-blade is the support member, because it supports the branch while cutting.

In the case where the power tool is a circular saw, its rotary blade is the machining member, because it allows an object, such as a piece of wood, to be cut, and the tray including the passage for the blade and resting on the object during the cutting operation is the support member.

In the case where the power tool is a plane, its blade is the machining member, as it allows an object, such as a wooden piece, to be cut, and the plate resting on the object during the cutting operation is the support member.

In the case where the power tool is a portable chainsaw, its rotary chain is the machining member, because it allows an object to be cut, and the chain guide of the portable chainsaw, around which the rotary chain moves, is the support member.

These types of tools have become more and more efficient and can generate a force of several kilo-Newtons. However, this efficiency has significantly increased the number of occupational accidents caused by such tools. The need for safety in relation to the movement of the moving blade of these tools has therefore increased rapidly.

Different solutions in the state of the art try to meet this need. For example, document FR2838998 discloses a safety device for motorized sharp or cutting tools, wherein the sharp or cutting tool comprises a machining member carrying two electrically conductive elements and insulated from each other by an insulating part. These conductive elements are part of a protective circuit that closes if another conductive element or a metal part forms a contact between these elements. This is the case if the tool comes into contact with a metal installation, for example metal wires, or with a metal-protected glove. In this case the clamping of the cutting elements is interrupted. This solution provides that the user necessarily wears metal or conductive gloves.

Document EP2020275 describes a security system for a portable saw comprising, on its blade, emitters generating a magnetic field. The user of this saw wears a protective garment comprising conductive loops, in which the magnetic field induces a voltage which is measured by a measuring device on the same garment. If this voltage is greater than a predetermined threshold, a signal is sent from the garment to a receiver placed in the saw, so as to interrupt its movement. This solution provides for the presence of several electronic components (transmitters on the saw, emitter on the garment, receiver on the saw) and requires the user to wear a special and heavy garment.

Document EP2885962 discloses another safety device for power tool comprising a metal mesh glove comprising a layer placed at a certain voltage level, different from the voltage level at which a blade of the tool is placed. This solution requires cables to connect to the glove, in order to fix its voltage level. These cables can be troublesome for the user during the handling of the tool. Furthermore, this type of metal glove is heavy to wear for the user.

Document EP1452280 discloses a chainsaw comprising a proximity sensor for detecting the presence of an object made of ferromagnetic material, conductive or opaque. This type of detector is not adapted for detecting the presence of a hand of a user.

Document US2013/0127262 discloses a power tool comprising a metal portion in correspondence with the area on which the user's hand is supported in order to carry the tool. If the other hand of the user touches the dangerous and metallic part of the tool, for example a sonotrode, a circuit comprising the body of the user closes, allowing the flow of a current that can be detected by a current sensor. This solution provides for the presence of a galvanic contact between the user and the tool.

Document WO2013136311 discloses a safety circuit for a power tool, with the circuit comprising an electrically conductive element located on the handle of the tool so as to be in contact with the hand holding the tool, a circuit line which connects a machining member of the tool to the electrically conductive member, an electrical power-generating means disposed on the circuit line, a voltage or current detection means disposed on the circuit line. Regulating means are provided for acting on an excitation circuit, in response to detection by the detection means, when a predetermined threshold value is exceeded, to force the machining member to stop functioning. This solution requires footwear means worn by the user to ensure electrical conductivity between at least one of the feet of the user and the ground.

Document FR2831476 describes a safety system for a shears in which the user must wear on the free hand a metal glove, connected by a wired connection to a control box. A tension is imposed on the blades of the pruner. The glove includes an antenna for sending an alert signal to the pruner control box when the hand comes too close to or touches the pruner blades, causing a detectable current flow through the housing. Alternatively, the user wears a jacket incorporating the wired connection between the glove and the control box. A similar solution is described in document FR2846729.

Document FR3001404 describes a security system for a pruner comprising a detector. This detector comprises a signal generator comprising a capacitor Cs coupled to an interface with the pruner blade, with the signal generator generating an integer number N of repetitions of a sequence comprising at least one pulse which is generated by charging and discharging the capacitor. A calculation module counts how many repetitions are necessary to have a voltage across the capacitance terminals greater than a predetermined voltage, and compares this number of repetitions with a reference value: this comparison indicates the presence or the absence of a contact with the blade. This solution is complicated and requires that a pulse train be generated by the detector's signal generator, the number of load transfers performed providing a digital value used by the system to detect contact with the blade.

Document US2010064532 discloses a chainsaw, provided with a security system comprising a tracking of the user's positioning. This security system is based on several transmitters placed on the chainsaw, including its blade, and on one or more receivers on the body of the user. The chainsaw includes a processor that is electrically connected to all transmitters and receivers through cables. The processor is configured to be able to detect a critical distance between one of the monitored body portions and a monitored surface of the chainsaw, based on the distance between each transmitter and receiver.

Document WO07060698 discloses a protection device for users of cutting tools provided with electromagnetic detection means. A protective support placed on the operator comprises a plurality of sensors emitting an electromagnetic signal, while the electromagnetic detection means operates as an antenna to allow a distance measurement.

Document GB2473061 relates to a security arrangement comprising an RFID tag and a sensor. The use of an RFID tag, which exploits a particular type of reflection of a signal ("backscattering"), makes it difficult to estimate a distance d on the basis of a received signal, since its attenuation is proportional to $1/d^6$. In addition, its operation is based on a magnetic field (H), for which the body of the user is transparent, and which makes the system very sensitive to metal parts of a power tool. In addition, the scope of an RFID link depends very much on the orientation of the tag (its coil) relative to that of the reader.

Some security systems of the state of the art exploit the presence of an electrostatic capacitance that is formed between a set of electrodes and an object to be protected. In particular, the frequency of an RC oscillator comprising this electrostatic capacitance is measured. This frequency depends on the distance between the electrodes and the object. These "capacitive" systems have several disadvantages: in the first place, the frequency varies a lot in time, which renders the measurement of the distance rather inaccurate. These systems are very sensitive to parasitic electrostatic fields, such as those produced by 50 Hz power lines or other power tools. The presence of conducting materials (rings, wristwatches, etc.) influences the shape of the electrostatic field and thus the measurement of the distance. Finally, the measuring principle is very sensitive to rain, humidity, etc., which makes these systems unsuitable for outdoor use, as is the case for several power tools.

BRIEF SUMMARY OF THE INVENTION

An object of the present invention is to provide a safety system for a power tool free of the limitations of known security systems.

Another object of the invention is to provide a safety system for a power tool that is an alternative to the known safety systems.

Another object of the invention is to provide a safety system for a power tool in which the user is not supposed to wear metal or conducting gloves, which are heavy, bulky and not very ergonomic.

Another object of the invention is to provide a safety system for a power tool in which the user is not supposed to wear a special and heavy garment.

Another object of the invention is to propose a safety system for a power tool in which the user is not supposed to wear footwear means to ensure electrical conductivity between at least one of the feet of the user and the ground.

Another object of the invention is to provide a safety system for a power tool that is less complicated than known solutions.

Another object of the invention is to provide a safety system for a power tool which allows an accurate measurement of the distance between the part of the user to protect and the dangerous part of the power tool.

Another object of the invention is to provide a safety system for a power tool that works reliably even in a humid or rainy environment.

According to the invention, these objects are achieved in particular by means of a safety system for a power tool according to claim 1, and by means of a method for a security system according to claim 17.

The safety system for a power tool according to the invention comprises a radio-electric signal generator arranged for generating a radio-electric signal, with this radio-electric signal generator being electrically coupled to the user so as to inject this radio-electric signal into the body of the user. This radio-electric signal is then transmitted by the user in the form of an electromagnetic signal.

In a preferred embodiment, this radio-electric signal generator is portable by the user, i.e. it has a size, dimensions and weight such that a user can wear it.

The safety system for a power tool in a variant embodiment of the invention comprises a device that is portable by a user, for example by a first limb of the user such as a hand.

In a preferred embodiment, the radio-electric signal generator injects the radio-electric signal into the body of the user via the portable device. In this variant, the portable device is electrically coupled to the user, for example to his first limb. This portable device may be for example a bracelet, a watch, a ring, a backpack, a belt, a harness, etc.

In the context of the present invention, the expression "portable device electrically coupled to the user" or "radio-electric signal generator electrically coupled to the user" indicates that an electrical signal, for example a radio-electric signal, can be exchanged between the portable device (respectively the signal generator) and the user, for example between the portable device (respectively the signal generator) and its first limb. In particular, this expression indicates that an electrical signal, for example a radio-electric signal, may be injected by the portable device (respectively by the signal generator) into the body of the user.

In a preferred embodiment, a galvanic contact exists between the portable device (respectively the signal generator) and the user, for example between the portable device and its first limb. In this respect, the portable device (respectively the signal generator) comprises at least one metal or conductive zone which comes into direct contact with the user, for example with its first limb. In another variant, there is no such galvanic contact. In this case the electrical signal is transmitted from the portable device (respectively signal generator) to the user via a capacitive coupling that forms naturally between the portable device (respectively the signal generator) and the user, for example between the portable device (respectively the signal generator) and the first limb.

In the context of this invention, the term "electrical signal" indicates a variation of an electric current or a voltage in a conductive element of an electrical circuit or in correspondence to a point of the electrical circuit. In particular, the size of the electrical circuit is negligible compared with the wavelength in the air corresponding to the frequency of an electrical signal, for example less than at least one order of magnitude at this wavelength. An electrical signal having a radio frequency will be named in this context "radio-electric signal".

The safety system for a power tool according to the invention also comprises a radio-electric signal generator, arranged for generating a reference radio-electric signal. In a variant, the portable device is arranged to cooperate with this radio-electric signal generator. In other words, the portable device is arranged to operate with the radio-electric signal generator.

In a first variant, the portable device comprises this radio-electric signal generator. In a preferred embodiment, this radio-electric signal generator is integrated in the portable device.

In a second variant, the radio-electric signal generator is a device separate and distinct from the portable device, and it is connected to the portable device via a connection element, for example and without limitation a wired connection element.

In both cases, in a preferred embodiment, the portable device operates in conjunction with the radio-electric signal generator so as to inject into the user's body the radio-electric signal generated by the radio-electric signal generator.

The body of the user, including notably his hand, comprises a large amount of water. It is therefore made of dielectric material having a high relative permittivity (that is to say $\varepsilon_r \gg 1$) and has a non-magnetic behavior, because its relative magnetic permeability is substantially equal to 1 (i.e. $\mu_r \sim 1$). In other words, the user's body functions as an antenna when a radio-electric signal is injected into it.

This antenna (the user) transmits this radio-electric signal in the form of an electromagnetic signal. In other words, this antenna (the user) emits an electromagnetic signal corresponding to the radio-electric signal generated by the radio-electric signal generator and injected into the body of the user through the portable device.

Indeed, an antenna is generally arranged for receiving and/or transmitting an electromagnetic signal. In this context, the term "electromagnetic signal" indicates a signal whose wavelength in air corresponding to its frequency is not negligible compared to the propagation distance of the signal and/or the size of the objects that are in the ambient environment of the signal. An electromagnetic signal is generally a combination of two waves, one representative of an electric field and the other of a magnetic field.

The signals in the body of the user and those emitted by the user and which are therefore in the environment between the user and the power tool are examples of electromagnetic signals.

For example, if the frequency of a signal is 30 MHz, the corresponding wavelength in the air is 10 m: an electrical circuit has a negligible size with respect to this wavelength and the human body does not have a negligible size in relation to this wavelength. For such a frequency, the term "electrical signal", notably "radio-electric signal", will be used to designate the signal in the electric circuit, because the wavelength in the air corresponding to its frequency is negligible compared to the size of the electrical circuit. For the same frequency, the signal in the body of the user or transmitted by the body of the user will be designated with the expression "electromagnetic signal".

It is therefore clear in light of these definitions that an antenna connected to an electrical circuit can emit, in the form of an electromagnetic signal, an electrical signal, for example a radio-electric signal, received by an electrical signal generator, for example by a radio-electric signal generator.

In the same way, an antenna can receive an electromagnetic signal and transmit it to an electrical circuit in the form of an electrical signal, for example a radio-electric signal.

In a preferred embodiment, the frequency of the radio-electric signal generated by the signal generator belongs to certain frequency bands available for ISM applications, according to the regulation rules of the international frequency allocation table. Tests carried out by the applicant have indeed demonstrated that with a frequency belonging to such bands, the presence of vegetation disturbs the security system according to the invention less. Furthermore, selecting certain frequencies in these frequency bands available for ISM applications provides better resolution in measuring the distance between the user and a power tool.

In one variant, the reference electrical signal has a power comprised between 5 dBm and 20 dBm. In a preferred variant, it has a power of 10 dBm.

The safety system for a power tool according to the invention also comprises the power tool, which is arranged to be carried by a limb of the user, for example by a second limb distinct from the first limb wearing the portable device, with this tool power tool comprising a machining member, a support member for the object to be machined, an actuator connected to the machining member and an antenna.

Advantageously, the antenna is fastened onto the machining member and/or onto the support member. In a first variant, it is placed on a substantially planar surface of the machining member and/or of the support member, to which it is fastened for example by gluing, welding, or any other equivalent attachment means. In a second variant, the machining member and/or the support member comprises a housing for receiving the antenna, with the antenna being attached to this housing. In a preferred embodiment, this housing is a groove machined in the machining member and/or in the support member.

As the antenna has a non-zero thickness, in the first variant it exceeds the surface of the machining member or of the support member. On the other hand, in the second variant, the depth of the housing may correspond to the thickness of the antenna so that the antenna does not extend beyond the surface of the machining member or of the support member: this surface is therefore substantially planar.

The antenna fastened onto the machining member and/or on the support member of the power tool according to the invention can be arranged for receiving an electromagnetic signal emitted by the user, for example by its first limb, via the electrical coupling with the portable device, and for transmitting this electromagnetic signal to a calculation module of an electrical circuit in the form of a radio-electric signal.

Indeed, the security system according to the invention exploits the passage of the reference electromagnetic signal through a part of the body of the user and also the fact that the user, for example one of his limbs, can emit such a signal. The body of the user functions as an antenna. This antenna emits an electromagnetic signal received via the electrical coupling with the portable device. In the near field (i.e. for distances that are small compared to the wavelength of the electromagnetic signal), this antenna emits an electromagnetic signal whose electrical part is predominant.

For this reason, in a preferred variant, the antenna fastened onto the machining member and/or onto the support member of the power tool and intended to receive the signal transmitted by the user-antenna, is an antenna of the monopole type because it itself emits an electromagnetic signal whose electrical part is predominant.

In a preferred variant, the system according to the invention is based on an injection of a signal into the part of the user's body to be protected, upon reception of this signal by an antenna on the power tool, in particular on its member which can be dangerous for the user, and upon measurement of the variation, with respect to a predetermined threshold, of a parameter (for example amplitude and/or phase) of this signal, during the path between the part of the body of the user to be protected and the member that is dangerous for the user.

The safety system for a power tool according to the invention also comprises a calculation module mentioned above, arranged for determining a distance between the user and the machining member, for example a distance between the first limb of the user and the machining member and/or support member, on the basis of the electromagnetic signal that the antenna of the power tool transmits to it in the form of a radio-electric signal, and for modifying (for example stopping, reversing or changing) the speed of the actuator based on this distance.

In a variant, the calculation module is arranged for determining a distance between the user and the machining member and/or support member and/or a speed of the user relative to the machining member and/or support member (or a speed of the machining member and/or support member relative to the user) based on a comparison between a parameter (e.g. the amplitude and/or the phase) of the radio-electric signal corresponding to the electromagnetic signal received by the antenna of the power tool and a threshold.

This threshold can be predetermined, be determined automatically by the calculation module during a calibration phase of the tool (as will be seen later) or be inserted using haptic means (such as buttons for example) in the calculation module by the user directly.

In another variant, the radio-electric signal generator can send the radio-electric signal to both the calculation module and to the portable device. In this case, the radio-electric signal generated by the radio-electric signal generator is referred to as the "reference radio-electric signal". The calculation module in this variant is arranged for determining a distance between the user and the machining member and/or support member on the basis of a radio-electric signal corresponding to the electromagnetic signal received by the antenna of the portable tool power, and of the reference radio-electric signal.

The security system according to the invention notably has the advantage over the prior art of not requiring the user to wear gloves that are necessarily metallic or conductive, which are heavy, nor particular clothing or shoes. The portable device can indeed be a bracelet, a watch, a ring or a non-metallic or non-conductive glove. It can also be a backpack, a harness or a belt. It can be worn by a hand, a finger or a thigh of the user, or on his trunk. Galvanic contact between this portable device and the user, as discussed, is not necessary. In some variations, however, such a contact is present.

Galvanic contact between the power tool and the user's limb wearing the tool is also not necessary nor desired. In other words, the contact between the power tool and the user's limb carrying the tool may be non-galvanic. In this case, the power tool is devoid of metal or conductive parts corresponding to the area on which the user's limb supporting the tool rests.

The calculation module can be integrated in the power tool, and/or in a control box of the power tool, with said housing being generally contained in the same support means carried by the user and containing the tool's power supply source, for example a backpack, a harness, etc. and/or in a remote housing, for example a housing on a belt worn by the user.

In a preferred embodiment, the power tool comprises an electronic card, with the electronic card comprising the antenna, and with a housing being arranged to receive the electronic card.

In another preferred embodiment, the power tool comprises two electronic cards, with each electronic card comprising an antenna, and the machining member and/or the support member has two sides, with each side comprising one of the two electronic cards. In a variant, each side comprises a housing for receiving one of the two electronic cards. In other words, on one side of the machining member and/or of the support member there is a housing which receives an electronic card, and on the other side of the machining member and/or of the support member, there is another housing that receives another electronic card. This variant allows the user to turn the tool during its use, while allowing an effective exchange of an electromagnetic signal between one of the two antennas and the portable device.

The electronic card on the machining member and/or on the support member may be a rigid electronic card, generally consisting of epoxy insulating layers reinforced by a fiberglass or ceramic frame. In another variant, it is pliable or flexible, made from thin insulating material, generally dielectric, for example of polyimide or ceramic. It can also be a so-called "flex-rigid" card, comprising both rigid parts and pliable or flexible parts.

In a preferred embodiment, the housing has a shape that matches the shape of the machining member and/or of the support member. In the case where the machining member is a blade, for example a blade of a pruner which is substantially C-shaped or arc-shaped, the housing is also substantially C-shaped or arc-shaped.

In another preferred embodiment, the support member that carries the antenna and/or the electronic card is a counter-blade, i.e. a blade which remains fixed relative to another movable blade (the machining member), which moves relative to the counter-blade. This variant is advantageous because the support member has a fixed position during machining. However, the presence of the antenna and/or of the electronic card on the machining member such as a movable blade is also possible.

In a preferred embodiment the machining member and/or the support member is machined, for example by milling or any other equivalent means, to obtain the housing for the antenna and/or the electronic card. This housing has a depth that depends on the thickness of the machining member and/or of the support member. In particular, the depth must be sufficiently smaller than the thickness of the machining member and/or of the support member to ensure strength, but at the same time sufficiently large to accommodate the antenna and/or the electronic card. In a preferred embodiment, the depth of this housing is of the order of magnitude of a few millimeters, for example between 1.5 mm and 3 mm.

The portable device of the user, in another variant, may itself comprise an antenna transmitting an electromagnetic reference signal. In this case, the system can exploit both the reference electromagnetic signal emitted by this transmitting antenna and the reference electromagnetic signal emitted by the user, for example by the limb of the user carrying the portable device, via the electrical coupling (galvanic or not) between this portable device and the user, for example his limb.

In another variant, the machining member and/or the support member may function as a transmitting antenna or include such an antenna, and emit the reference electromagnetic signal which is then received by a receiving antenna on the portable device.

In the variant where the receiving antenna is on the machining member and/or on the support member of the power tool, the calculation module according to the invention compares the reference radio-electric signal (or a threshold, for example a parameter of a signal, such as its amplitude and/or its phase) with the radio-electric signal corresponding to the electromagnetic signal emitted by the user, for example by this member, and received by the antenna of the machining member and/or of the support member (or with a parameter of this signal, for example its amplitude or its phase). The result of this comparison is a function of the distance between the user, for example his first limb, and the antenna, and therefore between the user (or his first limb which does not carry the power tool) and the machining member and/or the support member, since the position of the antenna with respect to the machining member and/or the support member is fixed during use of the power tool, and known a priori or well established during a calibration phase of the tool, as discussed below.

In order to compare these two signals, different possibilities are offered to those skilled in the art. In a first variant, the amplitude of the reference radio-electric signal is compared with that of the radio-electric signal corresponding to the electromagnetic signal received by the antenna or to a threshold. In a second variant, the phase of the reference radio-electric signal is compared with that of the radio-electric signal corresponding to the electromagnetic signal received by the antenna or to a threshold. In a third variant, the amplitude and the phase of the reference radio-electric signal are compared with those of the radio-electric signal corresponding to the electromagnetic signal received by the antenna or to thresholds.

In the variants using the phase of the radio-electric signal, this comparison is performed by a phase comparator in the calculation module, for example a mixer. This phase comparator may optionally be followed by a low-pass filter, for example for filtering continuous and low-frequency components. In the variants using the phase of the radio-electric signal, it is desirable to use two signals having different frequencies, one of which is used to reconstruct a time base.

As has been seen, in one variant, the radio-electric signal generator of the system according to the invention is integrated in the portable device. In another variant, the radio-electric signal generator of the system according to the invention is integrated in the power tool. In another variant, this radio-electric signal generator is in the control box of the power tool placed in a backpack or in a harness worn by the user. In another variant, it is in a remote housing of the power tool. In a preferred variant embodiment, the radio-electric signal generator and the calculation module belong to the same electronic card. In a preferential variant, this card is placed in the power tool or in the control box.

In a variant, the system according to the invention comprises a splitter of the reference radio-electric signal, arranged for sending this reference radio-electric signal to the portable device and to the calculation module. In this context, the word "splitter" indicates an electronic module having an input and at least two outputs.

In one variant, the system according to the invention comprises a first connection element connecting the splitter to the portable device, and a second connection element connecting the calculation module to the antenna. These connection elements, in one variant, are wired elements. Of course, wireless connection elements can also be used in place of the wired elements.

In one variant, the second connection element connecting the calculation module to the receiving antenna is a coaxial cable. In the variant where the phase of the reference radio-electric signal is compared with that of the radio-electric signal corresponding to the electromagnetic signal received by the antenna, the second connection element is a coaxial cable, whose outer conductor serves to impose a reference voltage, for example 0 volt.

In a preferred embodiment, the first connection element connecting the splitter to the portable device is wireless. In a preferred embodiment, the portable device is autonomous and includes one or more batteries. In another variant this battery is resp. these batteries are rechargeable: in this case, the portable device may include a connector that allows its wired connection with an external power source. In another variant, the portable device can be charged without wires. In another variant, the portable device uses solar energy to charge. A connection element also connects the splitter to the calculation module. In the case where the signal generator, the splitter and the calculation module belong to the same electronic card, this connection element can be a conductive track of this card.

In another preferred embodiment, there is no wired connection between the calculation module and the portable device. In other words, there is a wireless communication between the computing module and the portable device. In this variant, the portable device comprises the radio-electric signal generator; preferably, it also comprises an energy source connected to this generator in order to supply it. However, other solutions are also possible: for example, the signal generator can be powered by an external power source, or it can be arranged to be charged by solar energy. In all these variants, the presence of a splitter is not necessary.

Preferably, in this variant, the portable device comprises at least one metallic or conducting zone (for example in the form of one or more "pads"), which comes into direct contact with the user, in order to create a galvanic contact between the portable device and the user. However, as discussed, the presence of this galvanic contact is not necessary.

In a preferred embodiment, the radio-electric signal generator is arranged for generating a radio-electric signal having a frequency that changes over time. The presence of a frequency that is not fixed makes it possible to better discriminate the presence of an object other than the user's limb and therefore to better adapt to the characteristics of the environment in which the user is located. In a preferred embodiment, the radio-electric signal generator is arranged for generating at the same time a plurality of radio-electric signals having different frequencies.

In another variant, the radio-electric signal generator is arranged for generating a coded signal, to make it less sensitive to interference and thus increase the security of the system. In a preferred embodiment, the signal is digitally encoded. A decoding (correlation) carried out in the calculation module then makes it possible to discriminate the useful signal from the interference present in the environment. The coding of the signal is then used to perform a pairing between the power tool and the portable device. This pairing allows several users with the device to work close to each other without interference. This pairing is preferably done before the calibration of the system. If no pairing is performed, the portable device of the system according to the invention can not cooperate with the power tool, which makes the security system according to the invention non-operative.

In a preferred variant, the portable device and/or the power tool comprise motion sensors, for example inertial sensors such as accelerometers, gyroscopes, etc.

that can detect sudden movements of one of the user's limbs. These sensors can in this case communicate to the calculation module the presence of such movements and the calculation module can decide to send a signal to change the speed of the actuator of the power tool.

If the distance between the user and the machining member detected by the calculation module is small but not small enough to be considered dangerous, a first warning signal, for example a sound signal, an audio signal or a vibration, may be sent to the user to warn him of the possible danger. In this case the speed of the actuator of the power tool can be reduced automatically by the system. If this distance is judged to be dangerous, the speed of the power tool actuator may be reversed to move the user machining member away, or it may be reduced. In these cases too, a second warning signal, preferably a signal of higher intensity than that of the first warning signal, is sent to the user.

In another variant, the calculation module is arranged for determining not only the distance between the user and the machining member, but also the speed at which the user, for example his first limb, approaches the machining member, for example by integration of this distance.

The present invention also relates to a method for a security system, with the system comprising:
 a radio-electric signal generator, arranged for generating a radio-electric signal, said radio-electric signal generator being electrically coupled to the user,
 a power tool, with the power tool being arranged for being carried by a limb of the user, for example by a second limb of the user, distinct from the first limb, with the power tool comprising
  a machining member,
  a support member,
  an actuator connected to the machining member,
  an antenna fixed on the machining member and/or on the support member,
 the method comprising the following steps:
  injection of said radio-electric signal into the body of the user,
  emission by said user of an electromagnetic signal corresponding to said radio-electric signal,
  receipt by said antenna of the power tool of said electromagnetic signal
  determination by a calculation module of the system of a distance between the user and the machining member (for example between the first limb of the user and the machining member), on the basis of a radio-electric signal corresponding to the electromagnetic signal received by the antenna,
  changing the speed of the actuator based on this distance.

In a variant, the method also comprises the following steps:
 verification by the calculation module if a calibration of the security system has been performed;
 stopping the power tool if no calibration has been performed.

The calibration step makes it possible to take into account parameters of the environment where the user is located, for example the temperature and/or humidity, and also the position of the portable device relative to the user and/or to the size of the user. In particular, since the system according to the invention uses the transmission by the user's body of an electromagnetic signal, the calibration step makes it possible to take into consideration its physical characteristics, in particular its dimensions and its size.

In this variant during the calibration step, the user may be called upon to perform certain gestures, for example approaching the machining member until touching it, etc. During this phase the calculation module of the system according to the invention can determine a distance threshold between the user and the power tool which depends on the dimensions and/or the size of the user, below which the system intervenes to slow down or stop the actuation of the machining member of the power tool. In this variant, the system can be designed for not starting and/or for locking if this calibration step has not been performed.

In a preferred variant, this calibration step is performed not only at the start of the system according to the invention, but also during the operation of the power tool, for example after several hours of operation, because some conditions, for example the conditions of temperature and/or humidity, may have changed in the meantime.

In a variant, the system according to the invention also comprises at least one temperature sensor and/or one hygrometer, arranged for generating signals which are taken into consideration during the calibration and/or operation phase of the security system according to the invention.

In a variant embodiment, the method also comprises the following steps:
- coding of the radio-electric signal generated by the radio-electric signal generator,
- pairing a portable device with the power tool on the basis of said coded signal, with the radio-electric signal generator injecting the radio-electric signal via this portable device.

In a variant embodiment, the present invention relates to a safety system for a power tool (10), comprising:
- a device (20) that is portable by a user (1) and electrically coupled to said user,
- a radio-electric signal generator (40), arranged for generating a reference radio-electric signal (s (t)) and for sending it to said portable device (20),
- with the power tool (10) being arranged to be carried by a member of the user (1), said power tool (10) comprising:
  - a machining member (4),
  - a support member (2),
  - an actuator connected to the machining member (4),
  - an antenna, with said antenna being fastened onto said machining member (4) and/or onto said support member (2), and being arranged for receiving an electromagnetic signal emitted by said user (1) via the electrical coupling with the portable device (20),
- a calculation module (30), arranged for determining a distance between the user (1) and said machining member (4) on the basis of a radio-electric signal (s'(t)) corresponding to the electromagnetic signal received by said antenna and a reference radio-electric signal (s(t)), and for changing the speed of said actuator based on this distance.

In a variant embodiment, the present invention relates to a method for a security system, said system comprising:
- a device (20) portable by a user (1), said portable device being electrically coupled to said user (1),
- a radio-electric signal generator (40), arranged for generating a reference radio-electric signal (s(t)) and for sending it to said portable device (20),
- the power tool (10) being arranged for being carried by a limb of the user (1) and comprising:
  - a machining member (4),
  - a support member (2),
  - an actuator connected to the machining member (4),
  - an antenna, said antenna being fastened onto said machining member (4) and/or onto said support member (2), and being arranged for receiving an electromagnetic signal emitted by said user (1) via the electrical coupling with the portable device (20),
- said method comprising the following steps:
  - determination by a calculation module (30) of said system of a distance between the user (1) and said machining member (4) on the basis of a radio-electric signal (s'(t)) corresponding to the electromagnetic signal received by said antenna and a reference radio-electric signal (s(t)),
  - changing the speed of the actuator based on this distance.

BRIEF DESCRIPTION OF THE FIGURES

Examples of implementation of the invention are indicated in the description illustrated by the appended figures in which.

EXAMPLE(S) OF EMBODIMENT(S) OF THE INVENTION

In the following description given by way of example, reference will be made, for reasons of simplicity, to a power pruning shears. The invention however is not limited to such an instrument. The invention is also not limited to agricultural, but also includes, for example, shears, pliers, presses, chainsaws, portable circular saws, portable jigsaws, planers, crimpers, rippers, etc. for agricultural, viticultural, arboreal, industrial, craft, textile, food, medical, etc. applications.

Figure 4:
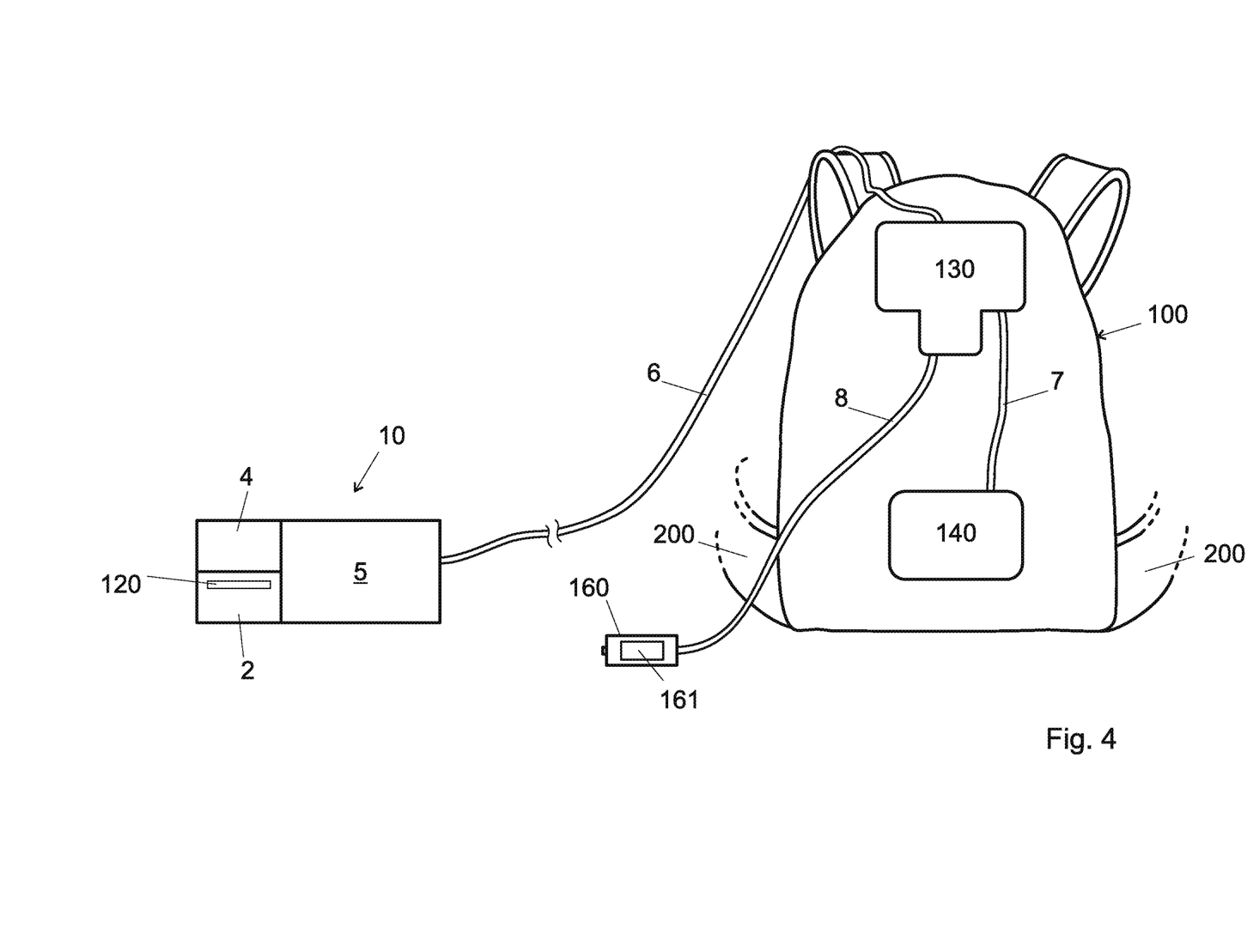
FIG. 4 illustrates an example of a system comprising the power tool of the security system according to the invention.

A schematic example of a power tool 10 of the system according to the invention is illustrated in FIG. 4. This tool is arranged to be worn by a user, for example by a limb of the user such as a hand. In a variant, this same hand can control the tool 10 via a trigger, not shown. In this case, the power tool 10 comprises a body 5, a machining member 4 and a support member 2.

The machining member 4 makes it possible to machine an object and comes into direct contact with this object. It is mobile during the machining of the object and actuated by an actuator (not shown) of the power tool 10, for example an electric motor.

As explained, in the context of the present invention, the word "machining" indicates any operation performed on the object that makes it possible to transform it, for example to cut, press, slice, plane etc.

The support member 2 supports the object during its machining and is movable during the machining of the object. The support member is not actuated by the actuator of the power tool 10. Its presence is necessary to achieve this machining. The support member 2 also comes into direct contact with this object during its machining.

In the case where the power tool 10 is a pruner, its movable blade is the machining member 4, as it allows to cut an object such as a branch, and the counter-blade is the support member 2 because it supports the branch during cutting.

In the example of FIG. 4, the support member 2 comprises a housing 120 for receiving an antenna, as will be seen later.

The power tool 10 is connected by a connection element 6, namely a cable in the example of FIG. 4, to a control box 130 of the tool, placed in a support means 100 carried by the user, in the example a backpack. This control box 130 is connected via the connection element 7 to one or more batteries 140 in the same support means 100, and via the connection element 8 to a remote housing 160, which may comprise a display 161, and which is generally placed on a belt 200 worn by the user. In the example shown, the belt 200 is part of the backpack 100.

Figure 1:
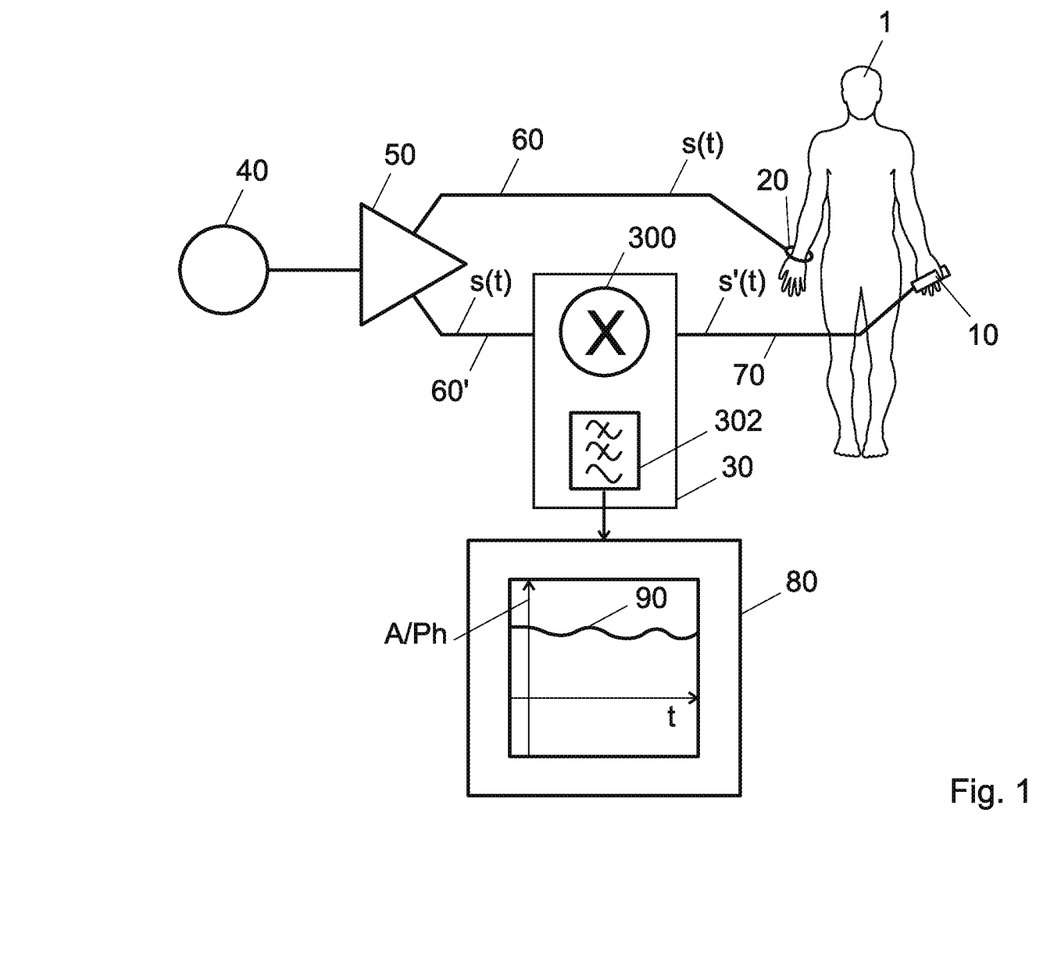
FIG. 1 illustrates a schematic example of an embodiment of the security system according to the invention.

FIG. 1 illustrates a schematic example of an embodiment of the security system according to the invention. In the illustrated example, the system according to the invention comprises a portable device 20, in this case a bracelet, carried by a first limb of a user 1, in this case his right hand. This portable device 20 is not necessarily a bracelet, but can also be a watch, a ring, a backpack, a harness, a belt, etc.

In the illustrated example, this portable device 20 is electrically coupled to the first limb of the user 1. However, this example is not limiting because the portable device 20 is coupled electrically to another part of the user's body, such as another limb or his trunk or head.

In the context of the present invention, the term "portable device electrically coupled to the user" indicates that an electrical signal, including a radio-electric signal, can be exchanged between the portable device 20 and the user. In particular, this expression indicates that an electrical signal, for example a radio-electric signal, can be injected by the portable device 20 into the body of the user 1.

In a preferred embodiment, a galvanic contact exists between the portable device 20 and the user 1. In this regard, the portable device 20 comprises at least one metallic or conductive zone (not shown) which comes into direct contact with the user 1, for example with the skin of his right hand. In another variant, there is no such galvanic contact. In this case the electrical signal is transmitted from the portable device 20 to the user 1 via a capacitive coupling which forms naturally between the portable device and the user, with the distance between the portable device and the user being less than 1 cm.

In the example illustrated in FIG. 1, the system according to the invention also comprises a power tool 10 which is arranged to be worn by a limb of the user, for example by a second limb of the user, in this case his left hand, with this tool power tool 10 comprising a support member 2 and a machining member 4. An actuator (not shown) in the power tool 10 is connected to the machining member 4. The power tool 10 also includes an antenna (not shown in FIG. 1).

Figure 2:
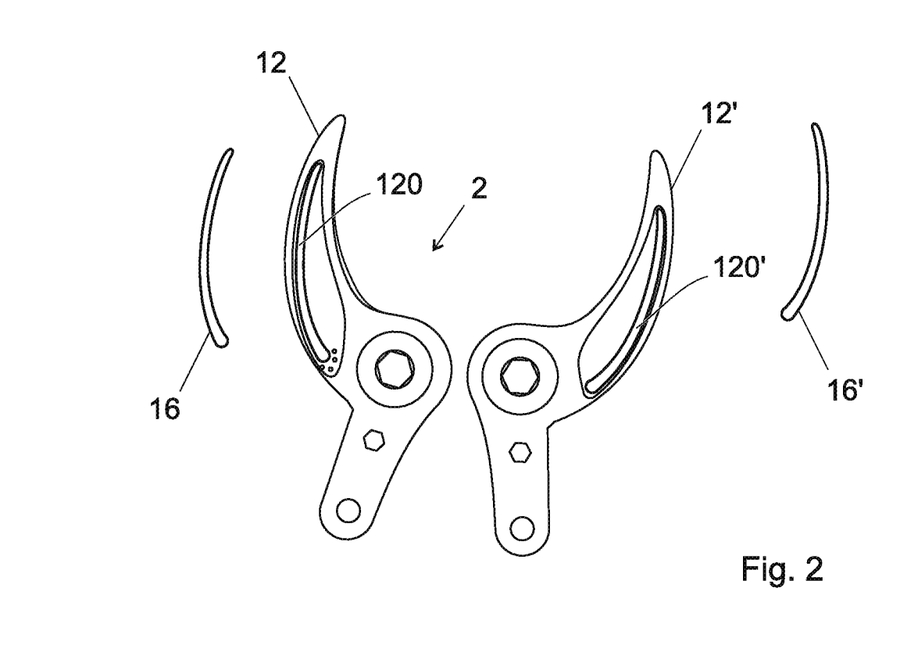
FIG. 2 illustrates an example of the two sides of a support member of the power tool of the system according to the invention, as well as an example of electronic cards designed to be received by these two sides of the support member.

In a variant embodiment, and as best seen in FIG. 2, the support member 2 is a counter-blade. In this variant, the counter-blade 2 comprises a housing 120 for receiving an electronic card comprising an antenna (not shown). The invention is not, however, limited to the presence of the antenna on the support member 2, since the antenna can be present alternatively on the machining member 4. In another variant, the support member 2 and the machining member 4 each carry an antenna.

The invention is not however limited to the presence of a housing for this antenna formed in the support member 2 and/or in the machining member 4, because the antenna can be simply fastened onto the support member 2 and/or onto the machining member 4 without either the support member 2 or the machining member 4 necessarily including a housing for receiving it. For example, the antenna is placed on a surface substantially planar of the machining member 4 and/or of the support member 2, to which it is fastened for example by gluing, welding, or any other equivalent attachment means.

The invention is, however, not limited either to the presence of the antenna on the support member 2 and/or on the machining member 4, since the antenna can also be placed on another part of the power tool 10, for example on its body 5, at a known distance from the support member 2 and/or from the machining member 4.

In the variant of FIG. 2, the two sides 12, 12' of the support member 2 comprise a housing 120 respectively 120', with each housing receiving an electronic card 16 respectively 16'. This variant allows the user to turn the tool 10, while allowing the security system according to the invention to operate effectively.

The system according to the invention illustrated in FIG. 1 also comprises a radio-electric signal generator 40, arranged for generating a reference radio-electric signal and for sending it to the portable device 20.

In another variant, not illustrated, the system according to the invention is devoid of a portable device 20. In this case, the radio-electric signal generator 40 is electrically coupled to the user 1. In this case, an electrical signal, including a radio-electric signal, can be exchanged between the radio-electric signal generator 40 and the user. In particular, a radio-electric signal can be injected by the signal generator 40 into the body of the user 1.

In a preferred embodiment, the frequency of the radio-electric signal belongs to certain frequency bands available for ISM applications, according to the regulation rules of the international frequency allocation table. Tests carried out by the applicant have indeed demonstrated that with this frequency, the presence of vegetation disturbs the security system according to the invention less. In addition, the selection of certain frequencies in these frequency bands available for ISM applications makes it possible to obtain a better resolution in the measurement of the distance between the user 1 and the power tool 10.

In particular, in the variant shown, the radio-electric signal generator 40 is followed by a splitter 50, which is arranged to send the reference radio-electric signal both to the portable device 20 and to a calculation module 30.

Indeed the system illustrated in FIG. 1 also comprises a calculation module 30, visible schematically, and arranged for determining a distance which in this case is between the right hand of the user and the support member 2 on the basis of the radio-electric signal, corresponding to the electromagnetic signal received by the antenna of the power tool 10, and of a reference radio-electric signal (or a threshold), and to modify (for example stop, reverse or change) the speed of the actuator of the tool 10 based on this distance.

The security system according to the invention thus exploits the passage of the electromagnetic signal corresponding to the reference radio-electric signal through a part of the body of the user 1 and also the fact that the user, for example a limb of the user, in this case his right hand, can issue such a signal.

The calculation module 30 can be integrated in the power tool 10, and/or in a control box 130 of the power tool, visible in FIG. 4, which is generally contained in the same support means carried by the user 1 and containing the tool's power source 140, for example a backpack 100, and/or in a remote housing 160, for example a housing for attachment to a belt 200 carried by the user. In another variant, the calculation module 30 can be integrated into the portable device 20.

The electronic card 16 on the support member 2 of the power tool 10 may be a rigid electronic card, generally consisting of insulating layers of epoxy reinforced with a frame of glass fibers or ceramic. In another variant, it is pliable or flexible, made from thin insulating material, for example polyimide or any other dielectric material. It can also be a so-called "flex-rigid" card, comprising both rigid parts and pliable or flexible parts.

In the variant of FIG. 2, the housing 120, 120' have a shape that matches the shape of the support member, in this case a shape of C or of an arc of circle. In the variant of FIG. 2, it is the counter-blade 2 which carries the electronic card(s). This variant is advantageous because the counter-blade 2 has a fixed position during cutting. However, the presence of the antenna and/or the electronic card on a machining member such as a movable blade 4 is also possible.

Figure 3:
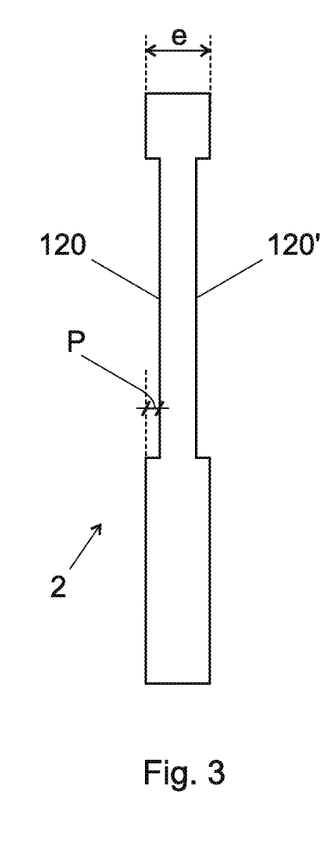
FIG. 3 illustrates a sectional view of a support member of an embodiment of the power tool of the system according to the invention.

In the variant of FIG. 2, the counter-blade 2 is machined, for example by milling or any other equivalent means, to obtain the housing(s) 120 respectively 120' for the electronic card(s) 16 respectively 16'. Each of these housings 120, 120' has a depth P, visible in FIG. 3, which depends on the thickness e of the support member 2. In the variant shown, this depth is equal for both sides 12, 12' of the counter-blade 2, but different thicknesses on both sides may also be possible. In particular, the depth P must be sufficiently smaller than the thickness e of the support member 2, in order to guarantee its solidity, but at the same time sufficiently large to accommodate the electronic card 16. In a preferred embodiment, the depth of this housing is of the order of magnitude of a few millimeters, for example between 1.5 mm and 3 mm.

The calculation module 30 of the system according to the invention compares the reference radio-electric signal (or a threshold) with the radio-electric signal corresponding to the electromagnetic signal received by the antenna of the support member 2 and/or of the machining member 4 (or a parameter of this signal such as its amplitude and/or phase). The result of this comparison is a function of the distance between the first limb of the user (the one that does not carry the power tool) and the support member 2 and/or the machining member 4 of the power tool 10, since the position of the antenna relative to the support member 2 and/or to the machining member 4 of the power tool 10 is fixed during the use of the power tool 10.

In order to compare these two signals, different possibilities are offered to those skilled in the art. In a first variant, the amplitude of the reference radio-electric signal (s(t) in FIG. 1 is compared with that of the radio-electric signal (s'(t) in FIG. 1 corresponding to the electromagnetic signal received by the antenna, or to a threshold. In a second variant, the phase of the reference radio-electric signal is compared with that of the radio-electric signal corresponding to the electromagnetic signal received by the antenna, or to a threshold. In a third variant, the amplitude and the phase of the reference radio-electric signal are compared with those of the radio-electric signal corresponding to the electromagnetic signal received by the antenna, or to thresholds.

In the variants exploiting the phase of the radio-electric signals, this comparison is made by a phase comparator 300, for example a mixer, in the calculation module 30, as visible in FIG. 1. This phase comparator 300 may optionally be followed by a low-pass filter 302, still illustrated in FIG. 1, for example for filtering DC and low-frequency components.

In a variant which will be discussed further below with reference to FIG. 6, the radio-electric signal generator 40 may be integrated into the portable device 20. In another variant, the radio-electric signal generator 40 can be integrated in the power tool 10. In another variant, this radio-electric signal generator 40 is in the control box 130 placed in a backpack 100 or in a harness worn by the user. In another variant, it is in a remote housing 160 of the power tool 10. In a preferred embodiment, the radio-electric signal generator 40 and the calculation module 30 belong to the same electronic card. In a preferred embodiment, this card comprising the radio-electric signal generator 40 and the calculation module 30 is placed in the power tool 10 or in the control box 130.

In the variant of FIG. 1, a first connection element 60 connects the splitter 50 to the portable device 20 and a second connection element 70 connects the antenna of the support member 2 and/or of the machining member to the calculation module 30. Another connection element 60' connects the splitter 50 to the calculation module 30. If the signal generator 40 and the calculation module 30 are integrated on the same card, this connection element 60' can be a conductive track on this card.

These connection elements 60 and 70 in a variant are wire elements. Of course, wireless connection elements can also be used in place of the wired elements. In a variant, the second connection element 70 connecting the antenna to the calculation module 30 is a coaxial cable. In the variant where the phase of the reference radio-electric signal is compared with that of the radio-electric signal corresponding to the electromagnetic signal received by the antenna, the second connection element 70 comprises a coaxial cable (not shown), the outer conductor of which serves to impose a reference voltage, for example 0 volts.

Mathematically, the radio-electric signal generated by the signal generator 40 can be represented with a purely cosine function, for example $$s(t) = A \cos \alpha$$

with $\alpha = 2 * \pi * f * t$, where A is the amplitude of the radio-electric signal, f is its frequency and t is the time. This signal is emitted by the user carrying the portable device 20 via the electrical contact with this portable device 20.

The radio-electric signal corresponding to the electromagnetic signal received by the antenna of the power tool 10 is a signal of the type $s'(t) = A' \cos \beta$, where $A' \neq A$ and $\beta = \alpha + \varphi$.

The difference in amplitude ($A' \neq A$) and that of phase ($\varphi$) depend on the distance between the user 1 and the receiving antenna of the power tool 10, for example between the first limb of the user 1 and the receiving antenna of the power tool 10.

When these two signals s(t) and s'(t), which have the same frequency, are passed through a phase comparator 300, by application of well-known trigonometric laws, one obtains after filtering through the low-pass filter 302 a function component of $\cos\varphi$. In this case, it is possible to exploit the phase difference between these two signals s(t) and s'(t) to determine the distance between the user 1 and the antenna of the tool power tool 10, for example between the first limb of the user 1 and the antenna of the power tool 10.

If, on the other hand, only the difference in amplitude of the two signals s(t) and s'(t) is used, a mixer 300 and a low-pass filter 302 are not necessary and it is possible to use in their place a voltage comparator.

Figure 5:
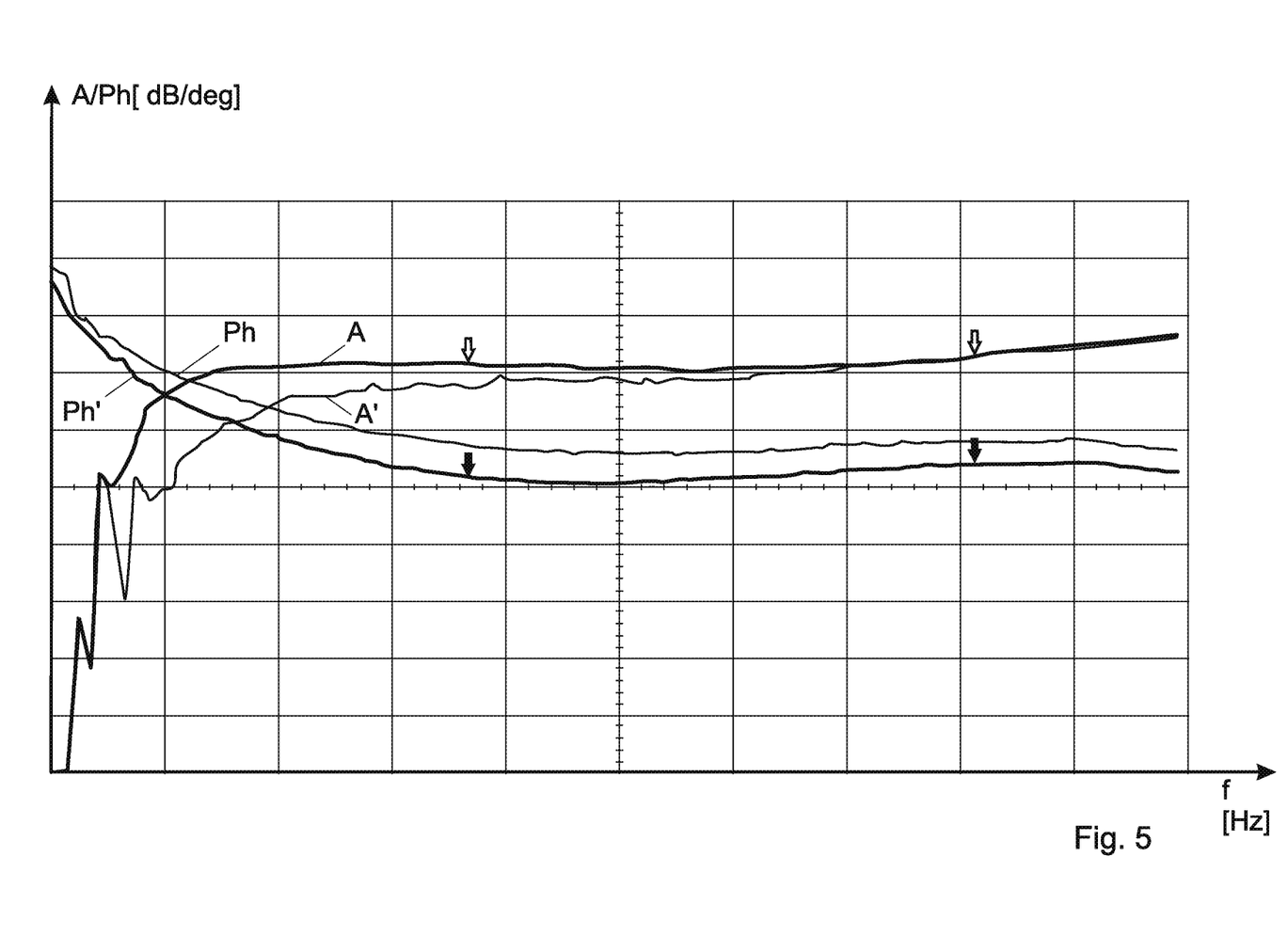
FIG. 5 illustrates an example of a change in the phase and the amplitude of the signal received by the antenna of the power tool of the system according to the invention.

FIG. 1 illustrates on a display 80 a graph 90 indicating how the phase and/or the amplitude of the electromagnetic signal received by the antenna of the support member 2 and/or of the machining member 4 of the power tool 10 varies. An example of graphics is also illustrated in FIG. 5. However, the system according to the invention does not necessarily include such a graphics display.

In a preferred embodiment, the radio-electric signal generator 40 is arranged to generate a radio-electric signal having a frequency that changes over time and/or is arranged for generate a plurality of radio-electric signals having different frequencies. The presence of a frequency which is not fixed makes it possible to better discriminate the presence of a branch or an object other than the user's limb and thus to better adapt to the characteristics of the environment where the user is.

In a preferred variant the portable device 20 and/or the power tool 10 comprise motion sensors (not shown), for example inertial sensors such as accelerometers, gyroscopes, etc. that can detect sudden movements of one of the user's limbs. These sensors can in this case communicate to the calculation module 30 the presence of such movements and the calculation module can decide to send a signal for modifying the speed of the actuator of the power tool 10.

If the distance between the user and the support member 2 and/or the machining member 4 detected by the calculation module 30 is small but not small enough to be considered dangerous, a first warning signal, by example a sound signal, audio signal or a vibration, can be sent to the user 1 to warn of the possible danger. In this case, the speed of the actuator of the power tool 10 can be decreased automatically by the system. If this distance is judged to be dangerous, the speed of the actuator of the power tool 10 may be reversed so as to move the machining member away from the user, or it may be reduced. In these cases too, a second warning signal, preferably a signal of higher intensity than that of the first warning signal, is sent to the user 1.

In another variant, the calculation module 30 is arranged for determining not only the distance between the user 1 and the support member 2 and/or the machining member 4, but also the speed at which the user, for example his first limb, approaches the support and/or machining member, for example by integration of this distance.

Figure 6:
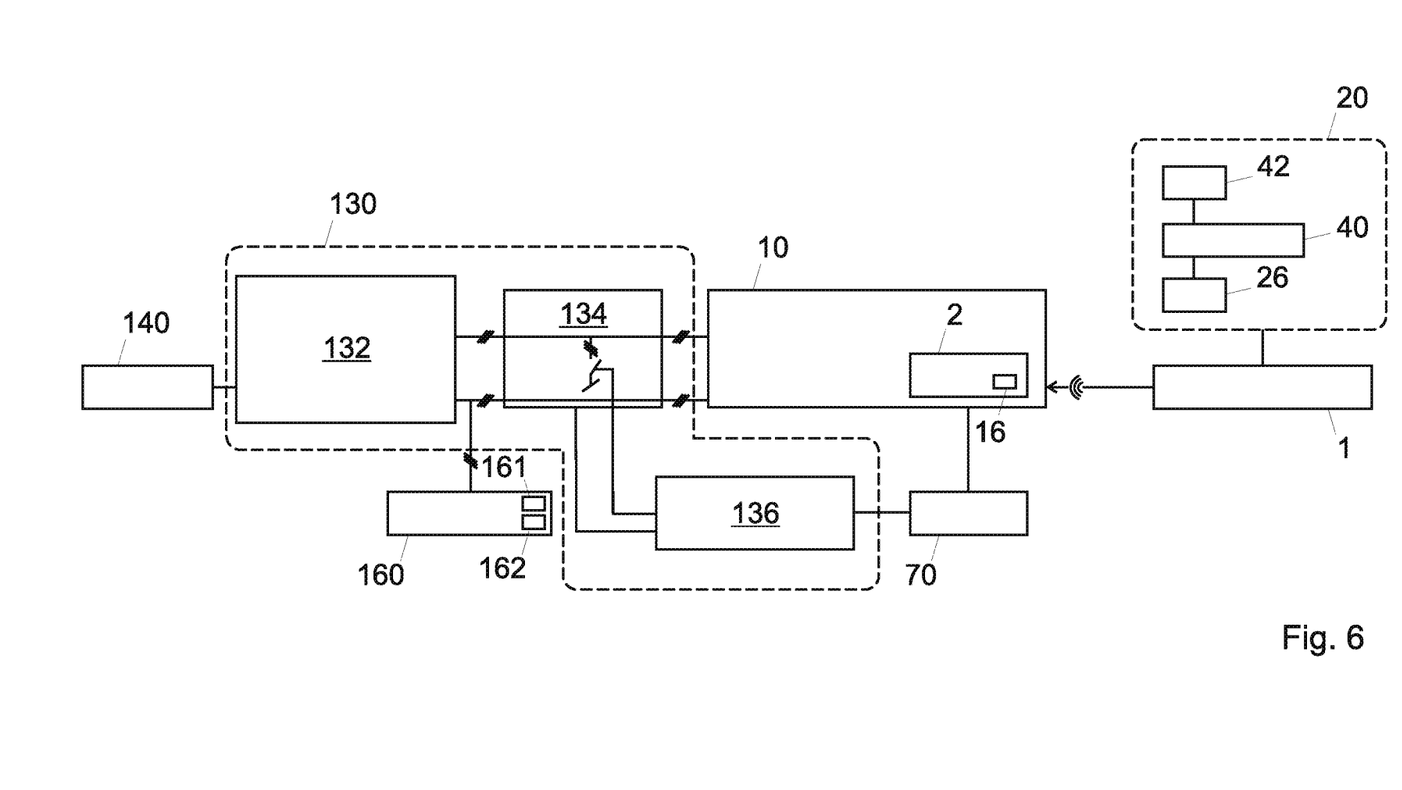
FIG. 6 illustrates a schematic example of another embodiment of the security system according to the invention.

FIG. 6 illustrates a schematic example of another embodiment of the security system according to the invention. In this variant, the portable device 20 comprises the radio-electric signal generator 40. In the variant of FIG. 6, the portable device 20 also comprises a power source 42 connected to this generator 40 in order to supply it. The presence of such a source 42 in the portable device 20 is not necessary because the radio-electric signal generator 40 may be powered (with or without wires) by an external power source (not shown). This external energy source may be alternative or complementary to the energy source 42 in the portable device 20.

In the variant where the portable device 20 comprises the radio-electric signal generator 40, the presence of a wired connection element 60 of FIG. 1 (between the signal generator 40 and the portable device 20) is not necessary.

In the variant illustrated in FIG. 6, the portable device 20 also comprises at least one metallic or conductive zone 26 (for example in the form of one or more "pads"), which is designed to come into direct contact with the user 1, in order to create a galvanic contact between the portable device and the user. However, as discussed, the presence of this galvanic contact is not necessary.

In a preferred embodiment, the portable device 20 is placed close to the part of the body of the user 1 to be protected. For example, the portable device 20 is a bracelet and is worn near the hand of the user 1 to be protected.

The signal generated by the radio-electric signal generator 40 is thus injected into the part of the body of the user to be protected (his hand for example) and the body of the user emits an electromagnetic signal corresponding to the signal generated by the radio-electric signal generator 40.

This signal is then received by an antenna (not shown), for example placed on an electronic card 16 on the support member 2 of the power tool 10.

Through the connection element 70 of FIG. 6 (which corresponds to the connection element 6 of FIG. 4), the signal received is sent to the control unit 130.

In a preferred embodiment, the connection element 70 is a wired connection element. In a preferred embodiment, it comprises a shielded cable.

In the variant of FIG. 6, the control unit 130 is connected to the power source 140 of the power tool 10 and a remote housing 160, which may include a display 161 and/or an ON/OFF button 162 of the power tool 10.

In the variant illustrated in FIG. 6, the control unit 130 comprises a control module 132 of the power tool, and a braking/stopping module 134 of the actuator of the power tool 10.

Although in FIG. 6 these two modules have been illustrated with two separate and serial blocks, it should be understood that the braking/stopping module 134 could be part of the control module 132 of the power tool 10.

The control box 130 of FIG. 6 also includes a decision module 136 which receives the RF signal received via the connection element 70 and which is arranged to decide how to control the braking/stopping module 134 based on the received signal.

In this case also, it should be understood that the decision module 136, although illustrated as a separate block of the control module 132 and the braking/stopping module 134, could be part of the control module 132 and/or of the braking/stopping module 134.

The calculation module (reference 30 in FIG. 1) is not explicitly illustrated in FIG. 6. It may belong to the control module 132 and/or the braking/stopping module 134 and/or to the decision module 136 and/or to a separate module, preferably placed in the control box 130 or connected to this box. In another variant, it belongs to the power tool 10.

The present invention also relates to a method for a security system, with the system comprising a radio-electric signal generator 40, arranged for generating a reference radio-electric signal and, electrically coupled to the user 1, the power tool being arranged to be carried by a member of the user 1, the power tool 10 including a machining member 4 a support member 2, an actuator connected to the machining member 4, an antenna fastened onto the machining member 4 and/or on the support member 2, with the method comprising the following steps:

injection into the body of the user 1 of said radio-electric signal s(t) via the electrical coupling between the user 1 and the signal generator 40, emission by the user 1 of said radio-electric signal s(t) in the form of an electromagnetic signal, reception of the electromagnetic signal by the antenna of the power tool 10, determination, by a calculation module 30 of the system, of a distance between the user 1 and the support member 2 and/or the machining member 4 on the basis of a radio-electric signal corresponding to the electromagnetic signal received by the antenna, changing the speed of the actuator based on this distance.

In a variant, the method also comprises the following steps:

checking, by the calculation module 30, whether a calibration of the security system has been performed;

stopping the power tool 10 if no calibration has been performed.

The calibration step makes it possible to take into account parameters of the environment where the user is located, for example temperature and/or humidity, and also the position of the portable device relative to the user and/or to the size of the user. In this respect, the system according to the invention comprises at least one temperature sensor and/or one hygrometer. In this variant, during the calibration step, the user may be called upon to perform certain gestures, for example approaching the machining member until touching it, etc. In this variant, the system is arranged to not start and/or to lock if this calibration step has not been performed. In a preferred variant, this calibration step is not performed only at the start of the system according to the invention, but also during the operation of the system, for example after a few hours of operation because certain conditions, for example the temperature conditions and/or humidity, may have changed meanwhile.

In a variant, the method also comprises the following steps:
coding of the radio-electric signal generated by the radio-electric signal generator 40,
pairing a portable device 20 with the power tool 10 on the basis of said coded signal, with the radio-electric signal generator 40 injecting the radio-electric signal via the portable device 20.

In a preferred embodiment, the pairing step is preferably performed before the calibration of the system. If no pairing is performed, the portable device of the system according to the invention cannot cooperate with the power tool, which makes the security system according to the invention non-operative.

Advantageously, the coding also makes it possible to make the system of the invention less sensitive to interference and thus to increase its security.

REFERENCE SIGNS USED INT HE FIGURES

1 User
2 Support member
4 Machining member
5 Body of the power tool
6,7,8 Connection elements
10 Power tool
12,12' Sides of the support member
16, 16' Electronic cards
20 Portable device
26 Metal or conductive zone
30 Calculation module
40 Radio-electric signal generator
42 Power source of the portable device
50 Splitter
60 First connection element
70 Second connection element
60' Third connection element
80 Display
90 Graphic
100 Supporting means
120, 120' Housing
130 Control box
132 Power tool control module
134 Braking/stopping module
136 Decision module
140 Power source
160 Remote box
161 Display of the remote box
162 ON/OFF button of the remote box
200 Belt
300 Phase comparator
302 Low pass filter
s(t) Reference radio-electric signal
s'(t) Radio-electric signal
A, A' Amplitude
Ph, Ph' Phase
e Thickness of the support member
P Depth of the housing 120

The invention claimed is:

1. A safety system for a power tool, comprising:
a radio-electric signal generator, arranged for generating a radio-electric signal, and said radio-electric signal generator being electrically coupled to said user so as to inject into the user's body said radio-electric signal, said radio-electric signal being then transmitted by said user in the form of an electromagnetic signal,
the power tool being arranged to be carried by a limb of the user, said power tool comprising
a machining member,
a support member,
an actuator connected to the machining member,
an antenna, said antenna being fastened onto said machining member and/or onto said support member, and being arranged for receiving said electromagnetic signal,
a calculation module, arranged for determining a distance between the user and said machining member and/or support member on the basis of a radio-electric signal corresponding to said electromagnetic signal received by said antenna of the power tool and a reference radio-electric signal, and for modifying the speed of said actuator based on this distance, and
a splitter of the radio-electric signal, arranged for sending said radio-electric signal to a portable device and to said calculation module, said reference radio-electric signal being the signal sent by said splitter to said calculation module.

2. System of claim 1, said machining member and/or said support member comprising a housing for receiving said antenna.

3. System of claim 1, said power tool comprising an electronic card, said electronic card comprising said antenna.

4. System of claim 3, said power tool comprising two electronic cards, each electronic card comprising an antenna, said machining member and/or said support member having two sides, each side comprising an electronic card.

5. System of claim 2, said housing having a shape that matches the shape of said machining member and/or of said support member.

6. System of claim 5, said machining member being a blade, said support member being a counter-blade, said housing being substantially C-shaped or arc-shaped.

7. System of claim 1, comprising said portable device.

8. System of claim 7, said radio-electric signal generator injecting said radio-electric signal into the body of the user via the portable device.

9. System of claim 7, said radio-electric signal generator being integrated in said portable device.

10. System of claim 7, said radio-electric signal generator being a device separate and distinct from the portable device, said system comprising a connection element between said radio-electric signal generator and said portable device.

11. System of claim 1, said calculation module being arranged for determining a distance between the user and said machining member and/or support member on the basis of a comparison between a parameter of the radio-electric signal corresponding to said electromagnetic signal received by the antenna of the power tool and a threshold.

12. System of claim 7, said portable device being a bracelet, a watch, a ring, a backpack, a belt or a harness.

13. System of claim 7, said portable device comprising a metallic or conductive zone so as to create a contact between the portable device and the user.

14. The system of claim 1, said radio-electric signal generator being arranged for generating a radio-electric signal having a frequency that changes over time and/or being arranged for generating a plurality of radio-electric signals having different frequencies.

15. A method for a security system, said system comprising
a radio-electric signal generator, arranged for generating a radio-electric signal, said radio-electric signal generator being electrically coupled to said user
a power tool being arranged to be carried by a limb of the user and comprising
a machining member,
a support member,
an actuator connected to the machining member,
an antenna, said antenna being fastened onto said machining member and/or onto said support member,
said method comprising the following steps:
injection into the body of the user of said radio-electric signal,
emission by said user of an electromagnetic signal corresponding to said radio-electric
reception, by said antenna of the power tool, of said electromagnetic signal,
determination, by a calculating module of said system, of a distance between the user and said machining member and/or support member on the basis of a radio-electric signal corresponding to the electromagnetic signal received by said antenna of the power tool and a reference radio-electric signal,
modification of the speed of the actuator on the basis of this distance, and
sending, by a splitter of the radio-electric signal, the radio-electric signal to a portable device and to the calculation module, the reference radio-electric signal being the signal sent by said splitter to the calculation module.

16. Method of claim 15, comprising the following steps:
verification by the calculation module if a calibration of said security system has been performed,
stopping said power tool if no calibration has been performed.

17. Method of claim 15, comprising the following steps:
coding of the radio-electric signal generated by the radio-electric signal generator,
pairing of said portable device the power tool based on said encoded signal, said radio-electric signal generator injecting said radio-electric signal via said portable device.

18. System of claim 13, said portable device comprising a metallic or conductive zone so as to create a contact between the portable device and said first limb of the user.

19. A safety system for a power tool, comprising:
a radio-electric signal generator, arranged for generating a radio-electric signal, and said radio-electric signal generator being electrically coupled to said user so as to inject into the user's body said radio-electric signal, said radio-electric signal being then transmitted by said user in the form of an electromagnetic signal,
the power tool being arranged to be carried by a limb of the user, said power tool comprising
a machining member,
a support member,
an actuator connected to the machining member,
an antenna, said antenna being fastened onto said machining member and/or onto said support member, and being arranged for receiving said electromagnetic signal,
a calculation module, arranged for determining a distance between the user and said machining member on the basis of a radio-electric signal corresponding to said electromagnetic signal received by said antenna, and for modifying the speed of said actuator based on this distance,
said power tool comprising two electronic cards, each electronic card comprising an antenna, said machining member and/or said support member having two sides, each side comprising an electronic card.

20. A safety system for a power tool, comprising:
a radio-electric signal generator, arranged for generating a radio-electric signal, and said radio-electric signal generator being electrically coupled to said user so as to inject into the user's body said radio-electric signal, said radio-electric signal being then transmitted by said user in the form of an electromagnetic signal,
the power tool being arranged to be carried by a limb of the user, said power tool comprising
a machining member,
a support member,
an actuator connected to the machining member,
an antenna, said antenna being fastened onto said machining member and/or onto said support member, and being arranged for receiving said electromagnetic signal,
a calculation module, arranged for determining a distance between the user and said machining member on the basis of a radio-electric signal corresponding to said electromagnetic signal received by said antenna, and for modifying the speed of said actuator based on this distance,
said machining member and/or said support member comprising a housing for receiving said antenna, said housing having a shape that matches the shape of said machining member and/or of said support member, said machining member being a blade, said support member being a counter-blade, said housing being substantially C-shaped or arc-shaped.

* * * * *